US010223642B1

(12) United States Patent
Felder

(10) Patent No.: US 10,223,642 B1
(45) Date of Patent: Mar. 5, 2019

(54) SYSTEM FOR MATCHING INDIVIDUALS AND FACILITATING INTERACTIONS BETWEEN USERS IN A SAFETY CONSCIOUS ENVIRONMENT

(71) Applicant: John Felder, Flower Mound, TX (US)

(72) Inventor: John Felder, Flower Mound, TX (US)

( * ) Notice: Subject to any disclaimer, the term of this patent is extended or adjusted under 35 U.S.C. 154(b) by 291 days.

(21) Appl. No.: 15/289,195

(22) Filed: Oct. 9, 2016

Related U.S. Application Data

(60) Provisional application No. 62/275,767, filed on Jan. 6, 2016.

(51) Int. Cl.
| | | |
|---|---|---|
| G06F 17/30 | (2006.01) | |
| G06N 7/00 | (2006.01) | |
| G06N 5/02 | (2006.01) | |
| G06F 3/0482 | (2013.01) | |

(52) U.S. Cl.
CPC ............... *G06N 7/005* (2013.01); *G06N 5/02* (2013.01); *G06F 3/0482* (2013.01)

(58) Field of Classification Search
CPC ........... G06F 17/30867; G06F 3/04842; G06F 3/0482; G06F 3/0481; G06F 17/3053; G06F 21/31; G06F 17/30958; G06F 3/0488; G06F 15/16; G06F 17/30; G06F 17/30011; G06F 17/30035; G06F 17/30038; G06F 17/30241; G06F 17/30256; G06F 17/30268; G06F 17/30312; G06F 17/30424; G06F 17/30554; G06F 17/30598; G06F 17/30864; G06F 17/3087; G06F 17/30991; G06F 21/32; G06F 21/552; G06F 21/6263; G06F 3/04817; G06F 17/16; G06F 17/2247; G06F 17/2252; G06F 17/24; G06F 17/30029; G06F 17/30247; G06F 17/30259; G06F 17/30274; G06F 17/30277; G06F 17/30289; G06F 17/30345; G06F 17/30386; G06F 17/3051; G06F 17/30528; G06F 17/30542; G06F 17/30569; G06F 17/30575; G06F 17/3064; G06F 17/30657; G06F 17/30675; G06F 17/30696; G06F 17/30734;
(Continued)

(56) References Cited

U.S. PATENT DOCUMENTS

| | | | | |
|---|---|---|---|---|
| 8,195,593 B2 * | 6/2012 | Jung | ........................ | G06N 5/02 706/12 |
| 8,615,479 B2 * | 12/2013 | Jung | .................. | A61B 5/04842 706/46 |

(Continued)

*Primary Examiner* — Sheree N Brown

(57) ABSTRACT

A method for matching individuals according to emotions evoked by music, includes the use of a plurality of personality matching questions to generate a response profile that is matched with a plurality of subsequent response profiles. A plurality of emotion-evoking audio files is provided for each of the plurality of personality matching questions, wherein a user account is prompted to select one of the plurality of emotion-evoking audio files as a response for each of the plurality of emotion-evoking audio files. The response for each of the plurality of personality matching questions is aggregated into the response profile along with a favorite song. A match probability rating is then calculated for the each of the plurality of subsequent response profiles in relation to the response profile of the user account. A plurality of subsequent user accounts is then displayed to the user account to engage in a virtual date.

10 Claims, 17 Drawing Sheets

(58) Field of Classification Search
CPC ......... G06F 17/30952; G06F 17/30961; G06F
17/3097; G06F 19/00; G06F 19/18; G06F
19/24; G06F 21/14; G06F 21/316; G06F
21/36; G06F 21/45; G06F 21/554; G06F
21/6218; G06F 21/84; G06F 2203/04803;
G06F 2221/0748; G06F 2221/2111; G06F
2221/2117; G06F 2221/2133; G06F
3/017; G06F 3/0346; G06F 3/041; G06F
3/0485; G06F 3/0486; G06F 3/04883;
G06F 3/1423; G06F 7/02; G06F 7/026
USPC .......................................................... 706/46
See application file for complete search history.

(56) References Cited

U.S. PATENT DOCUMENTS

| | | | | |
|---|---|---|---|---|
| 8,693,653 | B1* | 4/2014 | Mullen | H04M 3/4938 |
| | | | | 379/201.01 |
| 9,325,747 | B2* | 4/2016 | Mullen | H04M 3/4938 |
| 9,589,058 | B2* | 3/2017 | Balduzzi | G06F 17/30867 |
| 2004/0260781 | A1* | 12/2004 | Shostack | G06Q 30/02 |
| | | | | 709/207 |
| 2005/0171955 | A1* | 8/2005 | Hull | G06Q 50/01 |
| 2007/0073549 | A1* | 3/2007 | Terrill | G06Q 10/1053 |
| | | | | 705/26.1 |
| 2007/0282621 | A1* | 12/2007 | Altman | G06Q 10/10 |
| | | | | 705/319 |
| 2009/0307314 | A1* | 12/2009 | Smith | G06Q 30/08 |
| | | | | 709/206 |
| 2014/0171046 | A1* | 6/2014 | Mullen | H04M 3/4938 |
| | | | | 455/415 |
| 2014/0258260 | A1* | 9/2014 | Rayborn | G06F 17/30864 |
| | | | | 707/707 |

* cited by examiner

| ← | Wuji Me - Preferences | RESET |

Texas

City

Dallas

Zip/Postal code

Optional  ⓘ

Ethnicity

Select Ethnicity

Height range

Select From    Select To

Language

Select Language

UPDATE

START

FIG. 2

← Choose Music Genre    RESET

What is your preferred genre of music?

○ Rock

◉ Pop/Electro/Dance

SYSTEM FOR MATCHING INDIVIDUALS AND FACILITATING INTERACTIONS BETWEEN USERS IN A SAFETY CONSCIOUS ENVIRONMENT

The current application claims a priority to the U.S. Provisional Patent application Ser. No. 62/275,767 filed on Jan. 6, 2016.

FIELD OF THE INVENTION

The present invention relates generally to a system for matching similar individuals. More specifically, the present invention provides a method for matching individuals according to the emotions evoked from listening to original audio files specifically selected and composed for use within this invention.

BACKGROUND OF THE INVENTION

Present day, dating services are sometimes unsafe or unreliable. Sometimes, there are incidents of unsafe interactions, generalized discomfort in awkward social situations or mere superficial connections. Many times, users of dating services select matched individuals to engage with based primarily on the physical attributes of the individuals, rather than form an emotional connection with the individuals. It can be difficult to cultivate emotional connections, especially as many dating services do not provide an ice breaker or means of easing individuals into conversation. The lack of structured activities sometimes leads to tepid and uninteresting social experiences, as many users are hesitant to initiate conversation.

Therefore it is an object of the present invention to provide a system for matching individuals and facilitating interactions between users in a safety conscious environment. A plurality of match making modules is provided to pair users and promote user engagement; namely a music response module, a dating questionnaire module, and a purchase behavior match module. Each of the plurality of match making modules is provided in a safe, digital environment, wherein the access to personal information can be restricted according to user preferences. Furthermore, the plurality of match making modules provides a groundwork to facilitate interactions between users, allowing users to comfortably form emotional connections. Users who match through the plurality of match making modules can then schedule a virtual date, where further interaction can take place, and emotional connections can be cultivated in a safe environment.

BRIEF DESCRIPTION OF THE DRAWINGS

FIG. 2 is a depiction of the user interface for entering match preferences.

FIG. 3 is a depiction of some of the music genre selections for the favorite music genre.

DETAIL DESCRIPTIONS OF THE INVENTION

All illustrations of the drawings are for the purpose of describing selected versions of the present invention and are not intended to limit the scope of the present invention.

The present invention is a system for matching individuals and facilitating interactions between users in a safety conscious environment. The present invention provides a number of match making modules that are utilized to pair individuals with other users having similar interests. A user can select a match making method from a plurality of match making methods, wherein the user is directed to a corresponding match making module. The match making module guides the user through a process that is utilized to match the user with other individuals. The user can then select individuals to communicate with, wherein the present invention provides a safe digital environment.

The plurality of match making modules includes a music response module, a dating questionnaire module, a speed dating module, and a purchase behavior match module. The music response module is utilized to match individuals according to each individual's emotional response to audio files, wherein audio files are utilized to evoke emotions from each individual. The dating questionnaire module provides a match making game, wherein the identity of each individual is incrementally revealed as the game progresses. The speed dating module allows a group of individuals to interact with each other one-on-one in predetermined increments of time. The purchase behavior match module is utilized to match individuals according to purchase behavior data (based on the user's purchases made at supermarkets, department stores, etc.).

Figure 1:
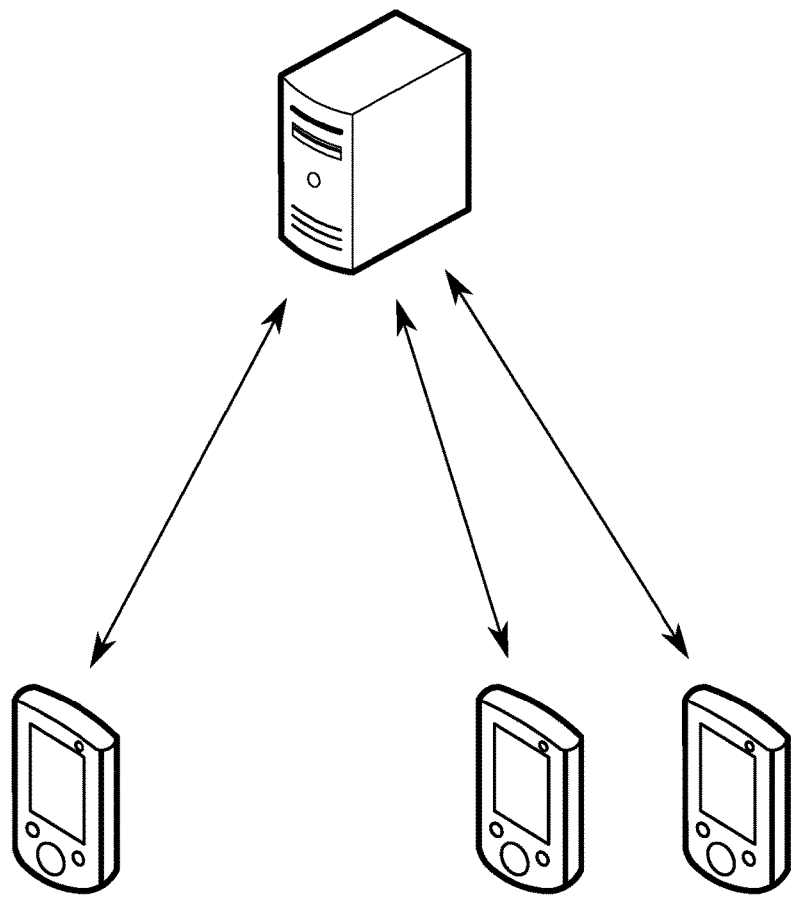
FIG. 1 is a diagram depicting the communications between the back-end system and the plurality of personal computing devices.

In reference to FIG. 1, each of the plurality of match making modules is hosted by a back-end system that is in communication with a plurality of personal computing devices. The back-end system can include any type of networking and database hardware that is required to provide a remote digital service. A software application is operated on each of the plurality of personal computing devices, providing a front end for the remote digital service. The plurality of personal computing devices can include laptops, smartphones, desktops, tablets, and/or other similar devices (now known or hereafter devised).

The music response module is designed to ask individuals several multiple choice questions, wherein the responses for each question are audio files. Each of the audio files is intended to elicit a different emotion in the individuals, wherein the individuals are prompted to select the audio file that conveys the closest emotional response to the question being asked. For example, the question may ask, "What song describes your last relationship?", wherein the individual would select the audio file that evokes the emotion felt most when thinking about the past relationship; one audio file may be intended to evoke happiness, another sadness, another anger, etc. In the preferred embodiment of the present invention, each of the audio files is an instrumental audio clip. However, in other embodiments, the audio files may also include instrumentals with vocals.

Figure 4:
FIG. 4 is a depiction of one of the plurality of personality matching questions and the plurality of audio files specifically selected to denote a connection with a most common emotion.
Figure 7:
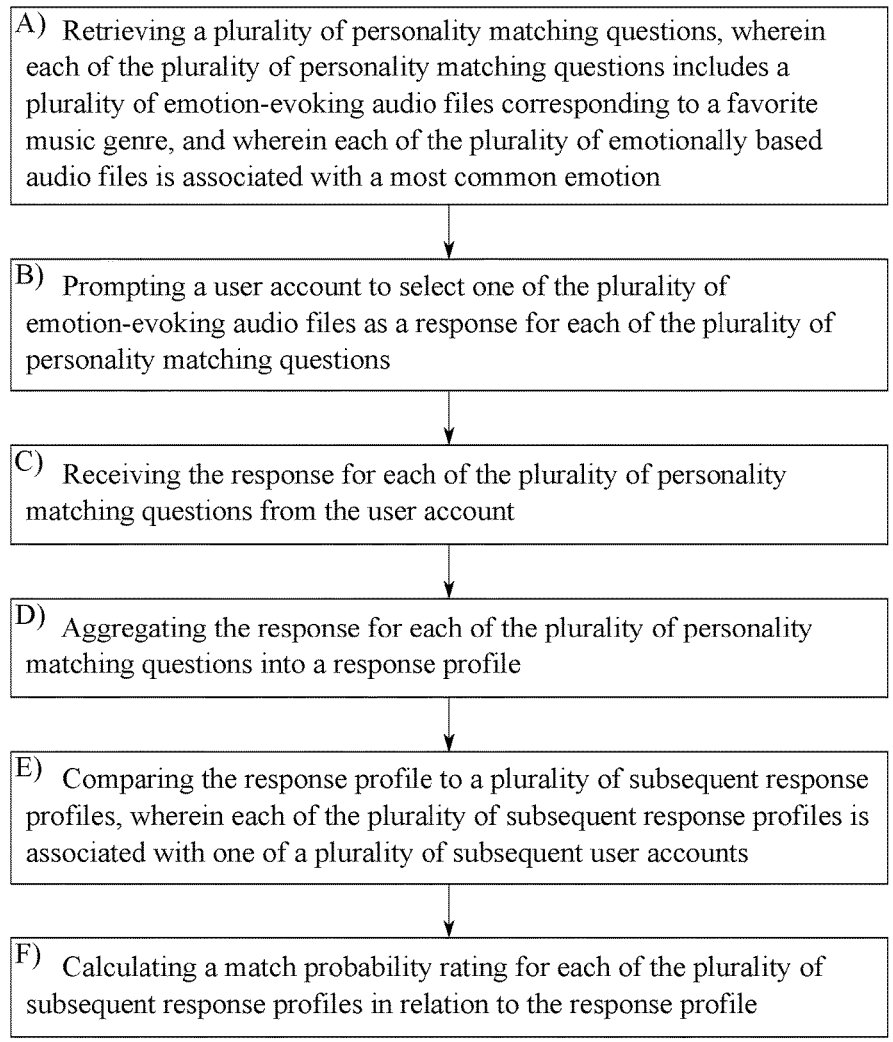
FIG. 7 is a flowchart depicting the steps for generating matches between a user account and a plurality of subsequent user accounts according to musical preferences.
Figure 8:
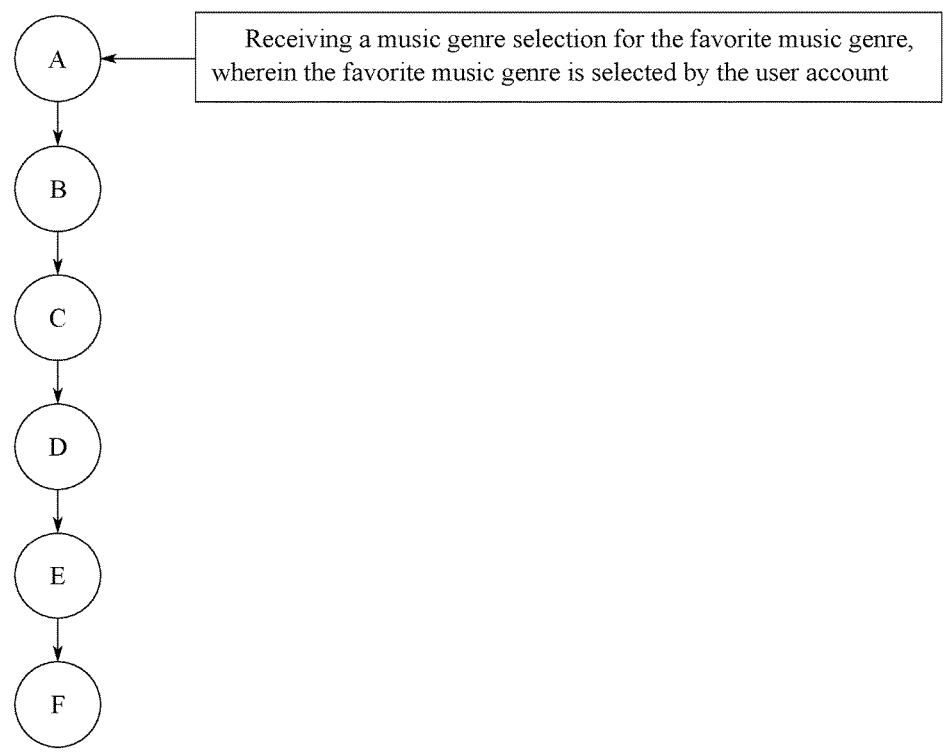
FIG. 8 is a flowchart thereof, further depicting the step of receiving the music genre selection.

In reference to FIG. 3 and FIG. 8, when a user account accessed on one of the plurality of personal computing devices selects the music response module from the plurality of match making modules, the back-end system first prompts the user account to select a favorite music genre. The user account selects the favorite music genre through the front end, wherein the back-end system receives a music genre selection for the favorite music genre. In reference to FIG. 7, the back-end system then retrieves a plurality of personality matching questions, wherein each of the plurality of match making questions includes a plurality of emotion-evoking audio files corresponding to the favorite music genre, as depicted in FIG. 4. For example, if the favorite music genre is pop, then each of the plurality of emotion-evoking audio files would contain instrumentals found in pop music.

Each of the plurality of emotion-evoking audio files is associated with a most common emotion (e.g. joy, anger, fear) such audio file usually evokes as determined by the responses of 1,000+ listeners pursuant to research performed on focus groups Such research is initiated outside of the module and entails providing a survey to 1,000+ participants who will listen to each audio file and comment/note the emotion evoked from such audio file. The most common emotion for each of the plurality of emotion-evoking audio files is predetermined, prior to presenting the plurality of personality matching questions to the user account. The method in which the most common emotion for each of the plurality of emotion-evoking audio files is determined may vary from one embodiment to another. In one embodiment, an administrator account selects and sets the most common emotion for each of the plurality of emotion-evoking audio files. In another embodiment, emotional coding may be utilized to correlate the most common emotion to each of the plurality of emotion-evoking audio files, wherein the emotional coding would map each of the plurality of emotion-evoking audio files to the most common emotion in a quantitative manner.

Figure 13:
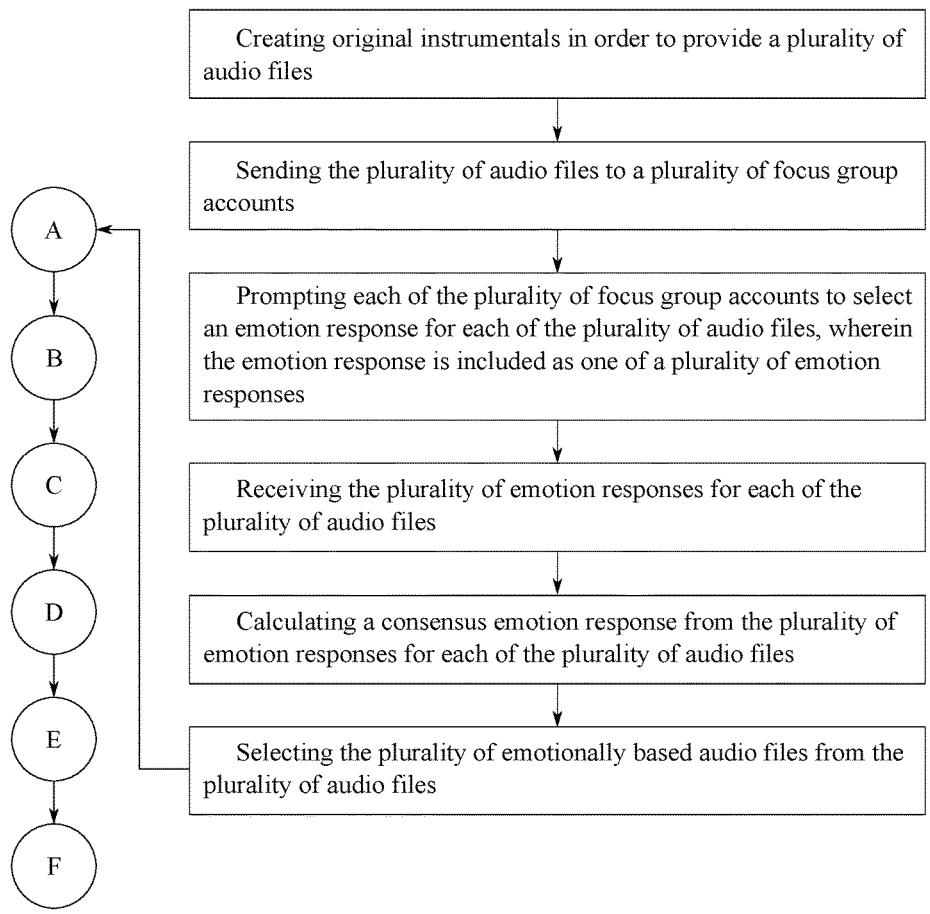
FIG. 13 is a flowchart thereof, further depicting the steps for determining the most common emotion that is associated with each of the plurality of emotion-evoking audio files.

In reference to FIG. 13, in the preferred embodiment of the present invention, the most common emotion for each of the plurality of emotion-evoking audio files is determined by a plurality of focus group accounts. A plurality of audio files is sent to the plurality of focus group accounts by a third party system. Each of the plurality of audio files is an original music file created by the administrator. The third party system prompts each of the plurality of focus group accounts to select an emotion response for each of the plurality of audio files; the emotion response being the emotion most closely evoked by the audio file. The third party system then receives a plurality of emotion responses for each of the plurality of audio files, wherein the emotion response from each of the plurality of focus group accounts is included as one of the plurality of emotion responses. After the third party system has received the plurality of emotion responses for each of the plurality of audio files, the third party system sends the plurality of emotion responses for each of the plurality of audio file to the back-end system.

The administrator then modifies the plurality of audio files as needed and determines a consensus emotion response for each of the plurality of audio files; the consensus emotion response being the most commonly selected emotion from the plurality of emotion responses. For example, if the plurality of emotion responses for one of the plurality of audio files reflects a vote of 40% happiness, 30% anger, and 30% sadness, then the consensus emotion response chosen would be happiness. In another embodiment, the consensus emotion response is calculated for each of the plurality of audio files by the back-end system by analyzing the plurality of emotion responses for each of the plurality of audio files. Once the consensus emotion response is determined, the consensus emotion response is set as the most common emotion. The plurality of emotion-evoking audio files can then be selected from the plurality of audio files according to the favorite music genre. For example, if the music genre is rock, then the plurality of emotion-evoking audio files having rock instrumentals will be selected from the plurality of audio files and presented as the selectable answers for the plurality of personality matching questions.

In another embodiment of the present invention, the back-end system is used to interact with the plurality of focus group accounts in place of the third party account. The plurality of audio files is sent to the plurality of focus group accounts by the back-end system, wherein the back-end system prompts each of the plurality of focus group accounts to select an emotion response for each of the plurality of audio files. The back-end system then receives the plurality of emotion responses for each of the plurality of audio files, wherein the emotion response from each of the plurality of focus group accounts is included as one of the plurality of emotion responses. After the back-end system has received the plurality of emotion responses for each of the plurality of audio files, the back-end system, or the administrator, determines the consensus emotion response for each of the plurality of audio files.

In reference to FIG. 7, once the plurality of personality matching questions has been retrieved, the back-end system prompts the user account to select one of the plurality of emotion-evoking audio files as a response for each of the plurality of personality matching questions. For example, three emotion-evoking audio files may be presented as a selectable answer for each of the plurality of personality matching questions; the user account then selects the emotion-evoking audio file that evokes the emotion that best fits as the answer to the question. Each of the plurality of personality matching questions is presented to the user account one at a time, wherein each of the plurality of emotion-evoking audio files can be played one at a time as selected by the user account, as depicted in FIG. 4. In the preferred embodiment, a link is presented for each of the plurality of emotion-evoking audio files, wherein clicking, or otherwise selecting, the link causes the associated audio file to be played. The back-end system receives the response for each of the plurality of personality matching questions from the user account, through the front end, wherein the back-end system saves the response and aggregates the response for each of the plurality of personality matching questions into a response profile for the user account. As such, the response profile includes the response selected by the user account for each of the plurality of personality matching questions.

Figure 9:
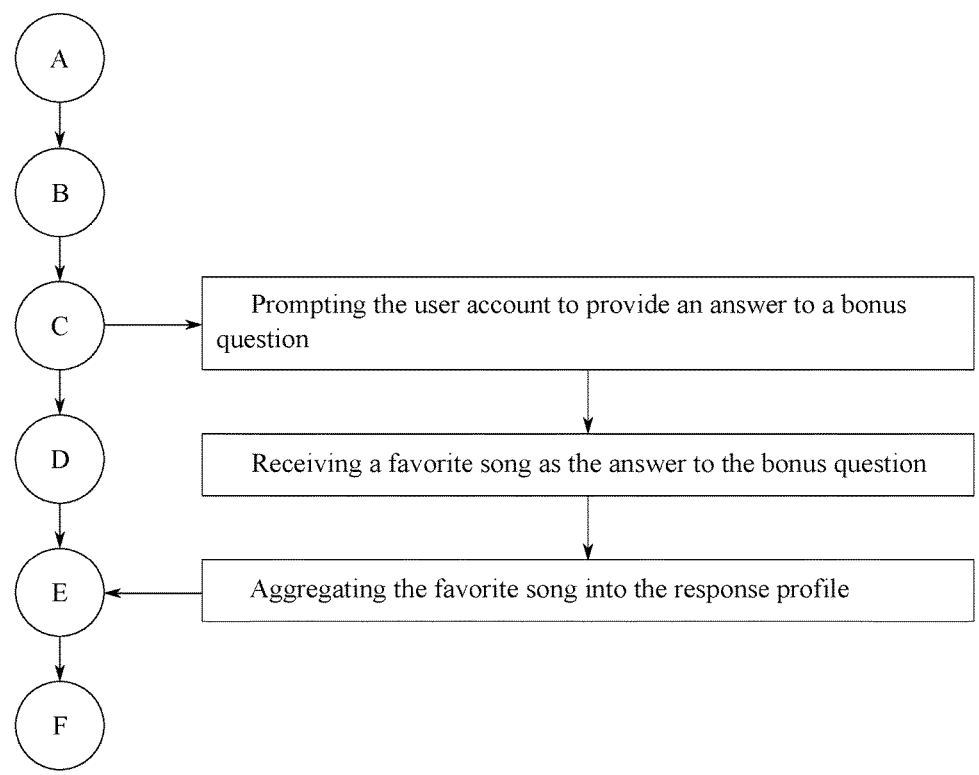
FIG. 9 is a flowchart thereof, further depicting the steps of retrieving a favorite song from the user account.

In reference to FIG. 9, following the plurality of personality matching questions, the back-end system may also prompt the user account to provide an answer to a bonus question. In the preferred embodiment, the bonus question asks the user account to enter a favorite song. Once entered through the front end, the back-end system receives the favorite song from the user account as the answer to the bonus question and aggregates the favorite song into the response profile. In other embodiments of the present invention, the bonus question may prompt the user account to provide information in place of or in addition to the favorite song, wherein said information is aggregated into the response profile.

In reference to FIG. 7, after the response profile has been constructed, the back-end system compares the response profile to a plurality of subsequent response profiles, wherein each of the plurality of subsequent response profiles is associated with one of a plurality of subsequent user accounts. In other words, each of the plurality of subsequent response profiles is an aggregation of the answers to the plurality of personality of matching questions for another user. Each of the plurality of subsequent response profiles is constructed in the same manner as the response profile for the user account, wherein each of the other users is prompted to answer the plurality of personality matching questions by selecting one of the plurality of audio files. For an arbitrary user account from the plurality of subsequent user accounts, a corresponding response profile is generated, wherein the corresponding response profile is included as one of the plurality of subsequent response profiles; the arbitrary account being for a random other user.

Figure 10:
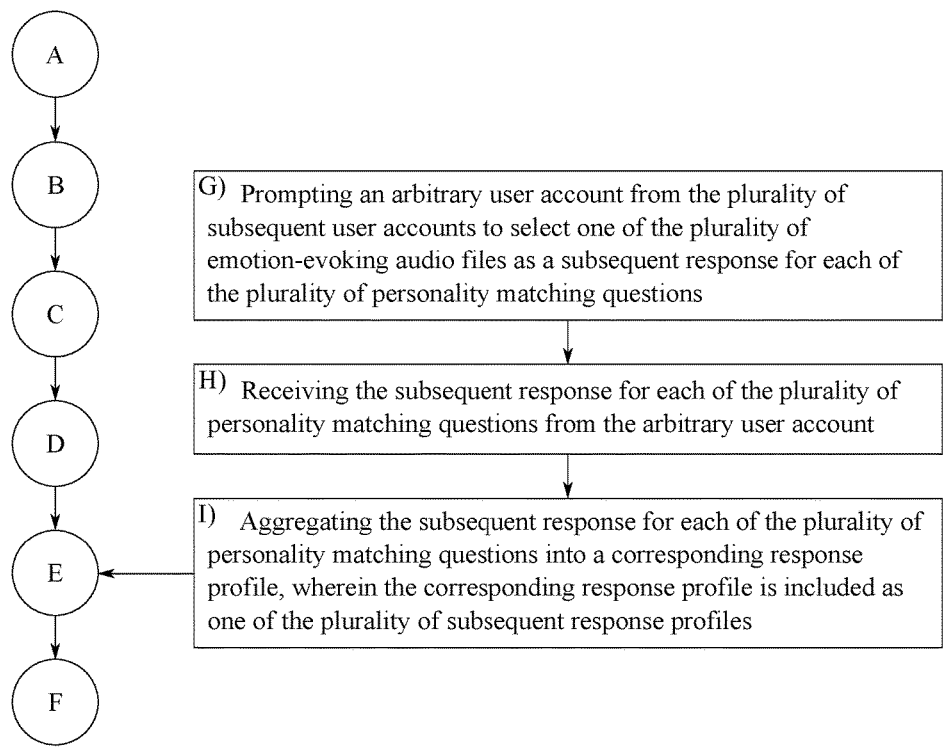
FIG. 10 is a flowchart thereof, further depicting the steps for generating a corresponding response profile for an arbitrary user account, wherein the corresponding response profile is used to match the arbitrary user account with the user account.

In reference to FIG. 10, to generate the corresponding response profile, the back-end system prompts the arbitrary user account to select one of the plurality of emotion-evoking audio files as a subsequent response for each of the plurality of personality matching questions. Each of the plurality of personality matching questions is presented to the arbitrary user account one at a time, wherein each of the plurality of emotion-evoking audio files can be played one at a time as selected by the arbitrary user account. The back-end system receives the subsequent response for each of the plurality of personality matching questions from the arbitrary user account, through the front end, wherein the back-end system aggregates the subsequent response for each of the plurality of personality matching questions into the corresponding response profile for the arbitrary user account.

Figure 11:
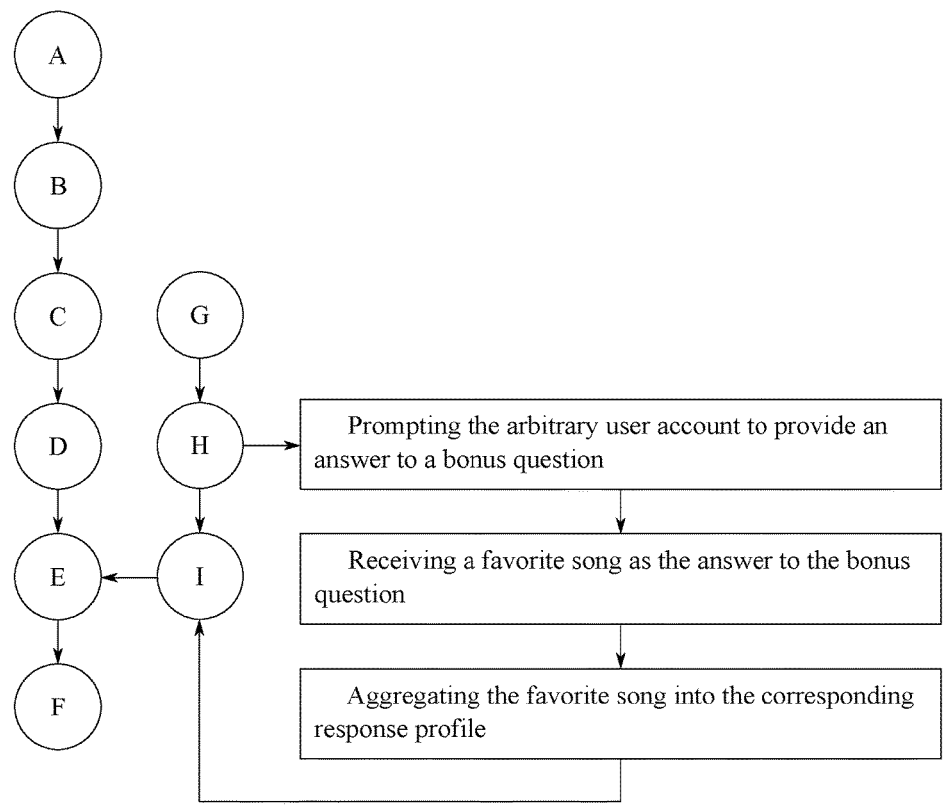
FIG. 11 is a flowchart thereof, further depicting the steps for retrieving a favorite song from the arbitrary user account.

In reference to FIG. 11, following the plurality of personality matching questions, the back-end system may also prompt the arbitrary user account to provide an answer to a bonus question. In the preferred embodiment, the bonus question asks the arbitrary user account to enter a favorite song. Once entered through the front end, the back-end system receives the favorite song from the arbitrary user account as the answer to the bonus question and aggregates the favorite song of the arbitrary user account into the corresponding response profile. In other embodiments of the present invention, the bonus question may prompt the arbitrary user account to provide information in place of or in addition to the favorite song of the arbitrary user account, wherein said information is aggregated into the corresponding response profile.

Figure 12:
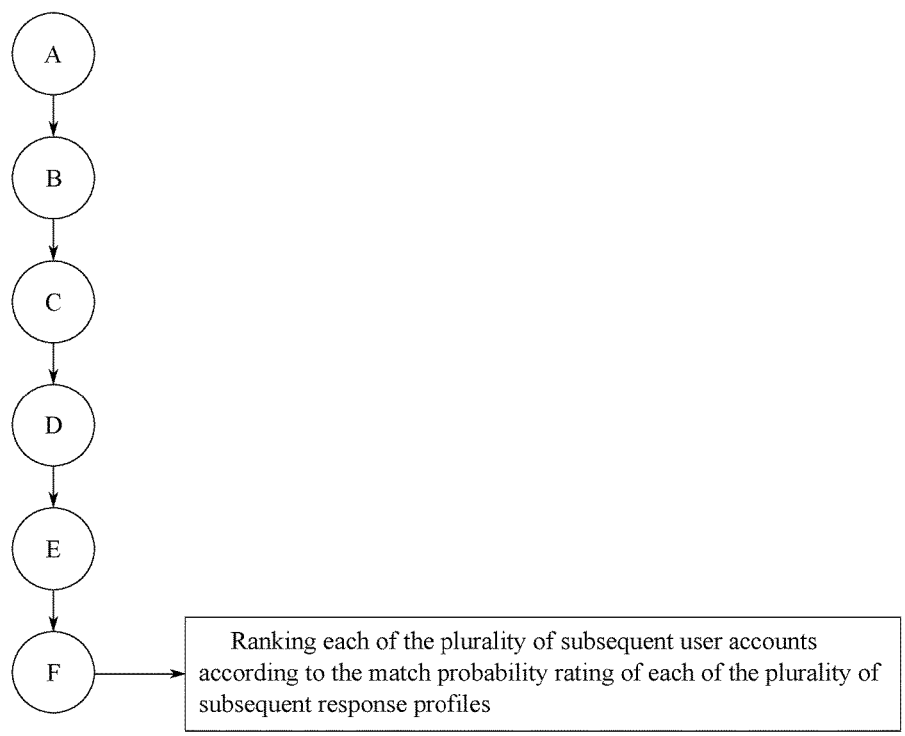
FIG. 12 is a flowchart thereof, further depicting the step for ranking the plurality of subsequent user accounts, prior to calculating the match probability rating for each of the plurality of subsequent response profiles.

In reference to FIG. 7, when comparing the response profile to each of the plurality of subsequent response profiles, the back-end system calculates a match probability rating for each of the plurality of subsequent response profiles in relation to the response profile. The match probability rating is a percentile of matching responses between the user account and one of the plurality of subsequent user accounts, wherein a higher percentage of matching responses indicates a closer emotional match. In reference to FIG. 12, the back-end system next ranks each of the plurality of subsequent user accounts according to the match probability rating of each of the plurality of subsequent response profiles. The plurality of subsequent user accounts is then displayed to the user account, wherein the plurality of subsequent user accounts is listed in descending order according to the match probability rating corresponding to each of the plurality of subsequent user accounts, as depicted in FIG. 5.

Figure 14:
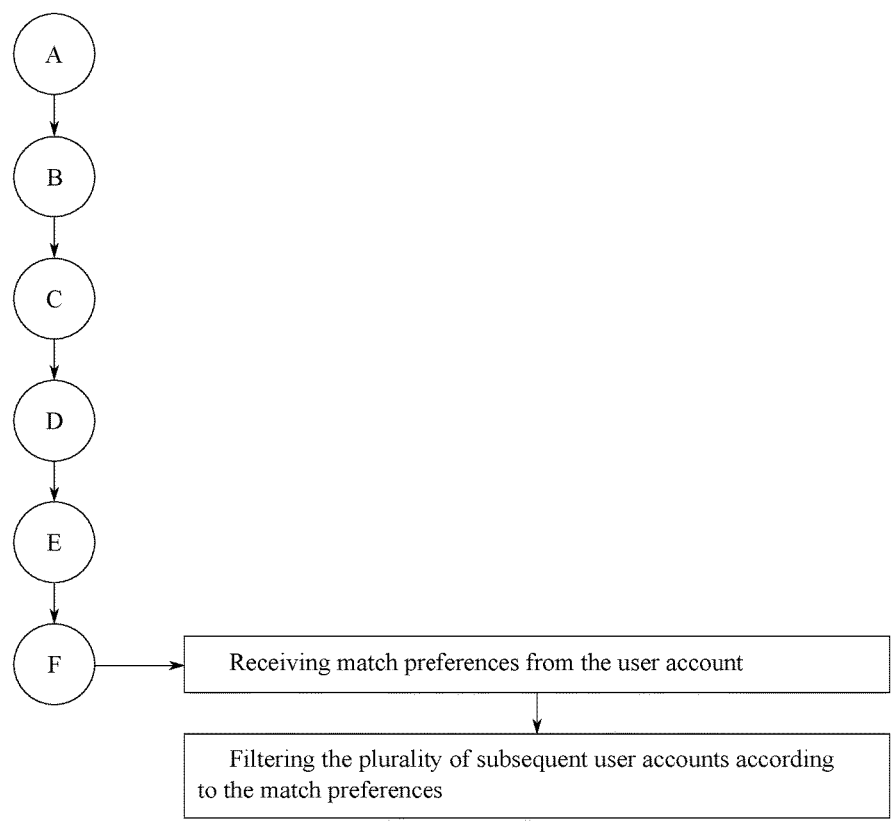
FIG. 14 is a flowchart thereof, further depicting the steps for filtering the plurality of subsequent user accounts according to match preferences.

The user account is also able to filter the plurality of subsequent user accounts displayed according to the match probability rating of each of the plurality of response profiles. In reference to FIG. 14, one method of filtering the plurality of subsequent user accounts is using match preferences that are selected by the user account. The match preferences can include information such as location data, an ethnicity, a height range, a spoken language, etc., as depicted in FIG. 2. For example, an individual may wish to only show matches that are within a certain location radius, that speak English, and that are under six feet tall. The match preferences are submitted by the user account, wherein the back-end system receives the match preferences from the user account and filters the plurality of subsequent user accounts according to the match preferences. In the preferred embodiment of the present invention, the user account submits the match preferences prior to answering the plurality of personality matching questions. However, it is also possible for the match preferences to be submitted after answering the plurality of personality matching questions.

Figure 15:
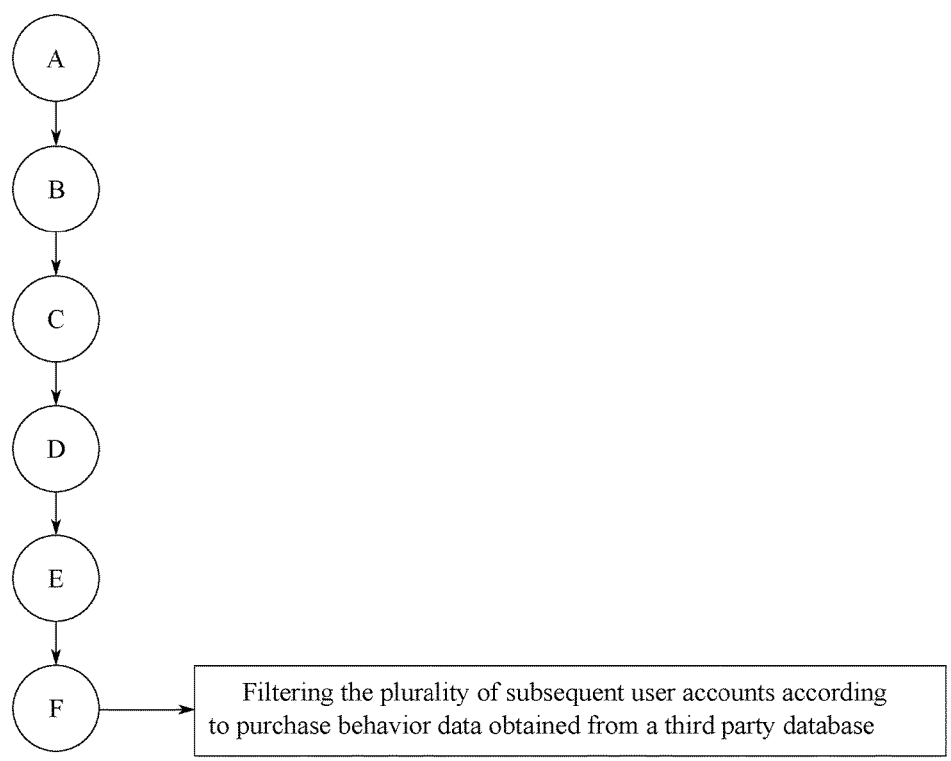
FIG. 15 is a flowchart thereof, further depicting the step for filtering the plurality of subsequent user accounts according to purchase behavior data related to a user's purchase of products from supermarkets, retail shops, ecommerce, etc.

In reference to FIG. 15, another method for filtering the plurality of subsequent user accounts, as displayed in a match list, is according to purchase behavior data obtained from a third party database. The third party database is associated with a vendor, such as a supermarket, grocery store, convenience store, online retailer, department store, etc. When an individual makes a purchase from the vendor, information such as the items purchased, the frequency of purchases, the date of purchase, and the cost of purchase are recorded in the third party database as the purchase behavior data. The purchase behavior data is recorded for both the user account and the plurality of subsequent user accounts. When the user account chooses to filter the plurality of subsequent user accounts displayed in the match list using the purchase behavior data, the purchase behavior data for the user account and the plurality of subsequent user accounts is retrieved by the back-end system. The back-end system then compares the purchase behavior data for the user account to the purchase behavior data of each of the plurality of subsequent user accounts. Various parameters (e.g. number or purchases, purchase price, items purchased, etc.) contained in the purchase behavior data for the user account and the plurality of subsequent user accounts are correlated and matched. The resultant comparative data is then used in addition to the plurality of subsequent response profiles to determine best match fits between the user account and the plurality of subsequent user accounts. For example, if two subsequent users have the same number of matched answers, but the purchase behavior data for one user is more similar to the purchase behavior data of the user account, then the user with the more similar purchase behavior data will be ranked higher as a more compatible match.

Figure 5:
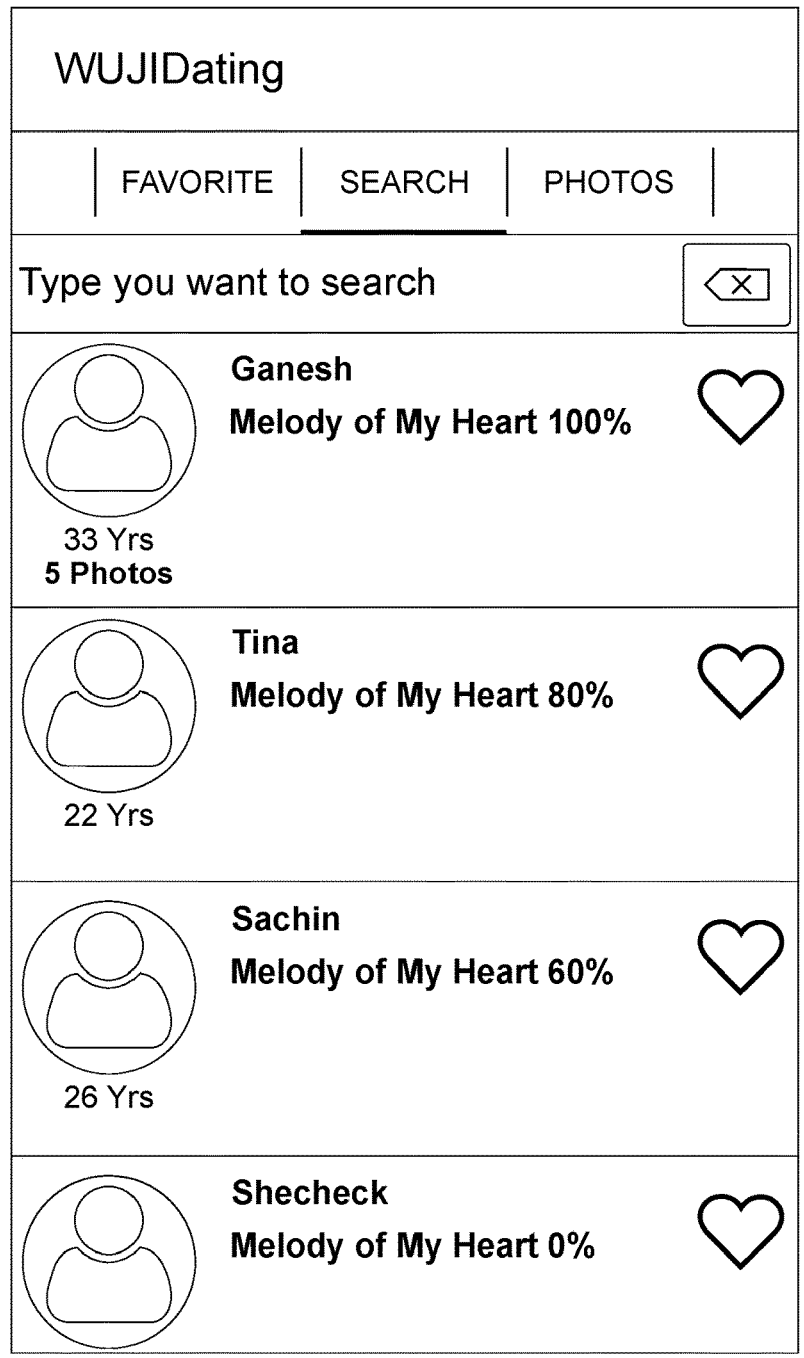
FIG. 5 is a depiction of the plurality of subsequent user accounts being ranked according to the match probability rating.
Figure 6:
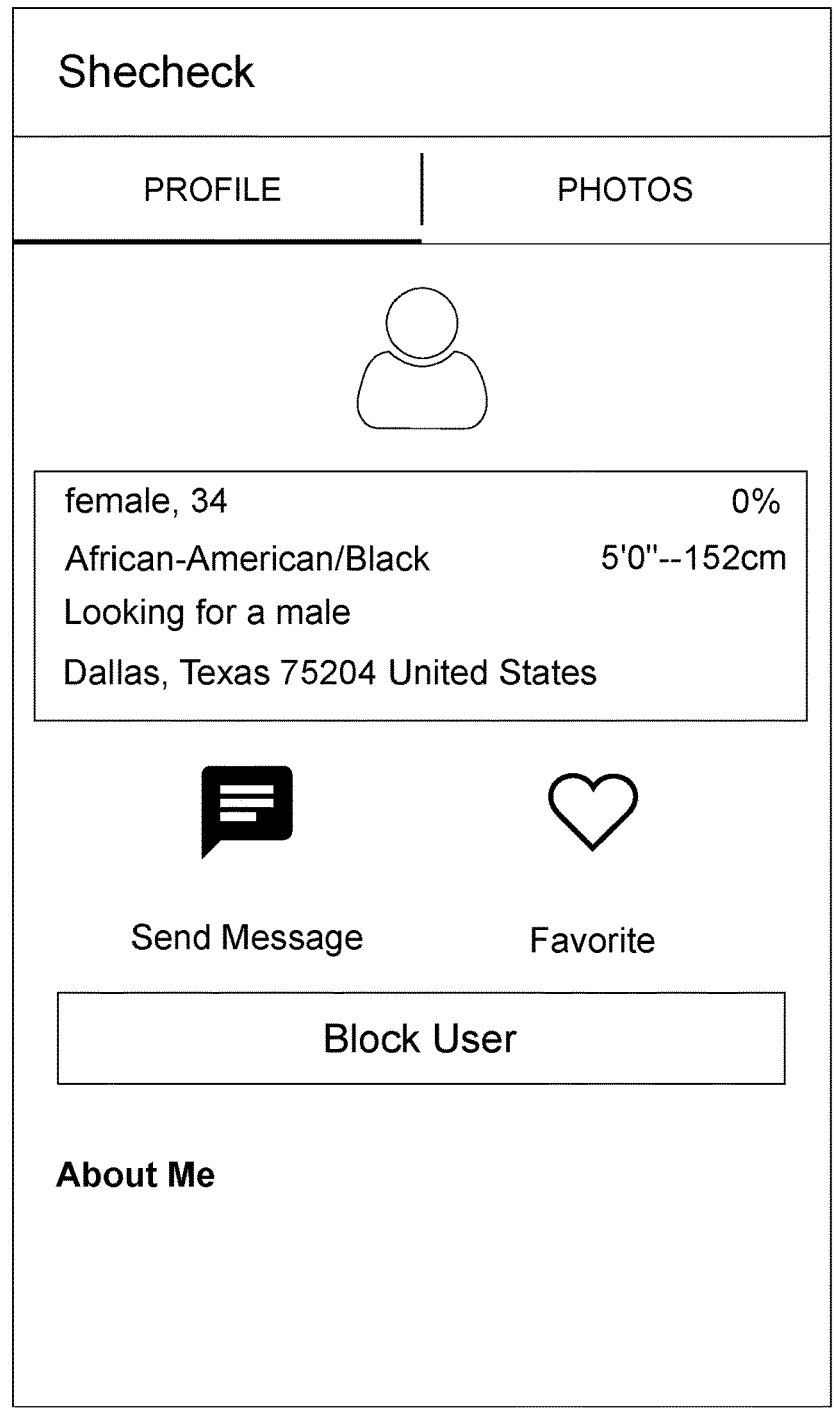
FIG. 6 is a depiction of the profile page of a selected user account with a 0% match probability rating, from the plurality of subsequent user accounts.

Upon viewing the plurality of subsequent user accounts, the user can choose a profile page of a selected user account from the plurality of subsequent user accounts, as depicted in FIG. 5, and initiate communication with the selected user account. In order to block out undesirable candidates, the present invention provides an ask me feature, which allows each individual to create a plurality of screening questions; the plurality of screening questions being customized by each individual. Each individual can define the specific number of questions included in the plurality of questions, the content of each of the questions, the corresponding answer to each of the questions, and the number of correct responses required to allow communication with the requesting user. Each individual may create unique, original questions, or the questions may be selected from template questions stored in a database of the back-end system. In the preferred embodiment, each of the questions is a yes or no question, however, in other embodiments, different question types may be utilized. Each individual can toggle the ask me feature on an off through a tab or button located within the profile of the individual.

Figure 16:
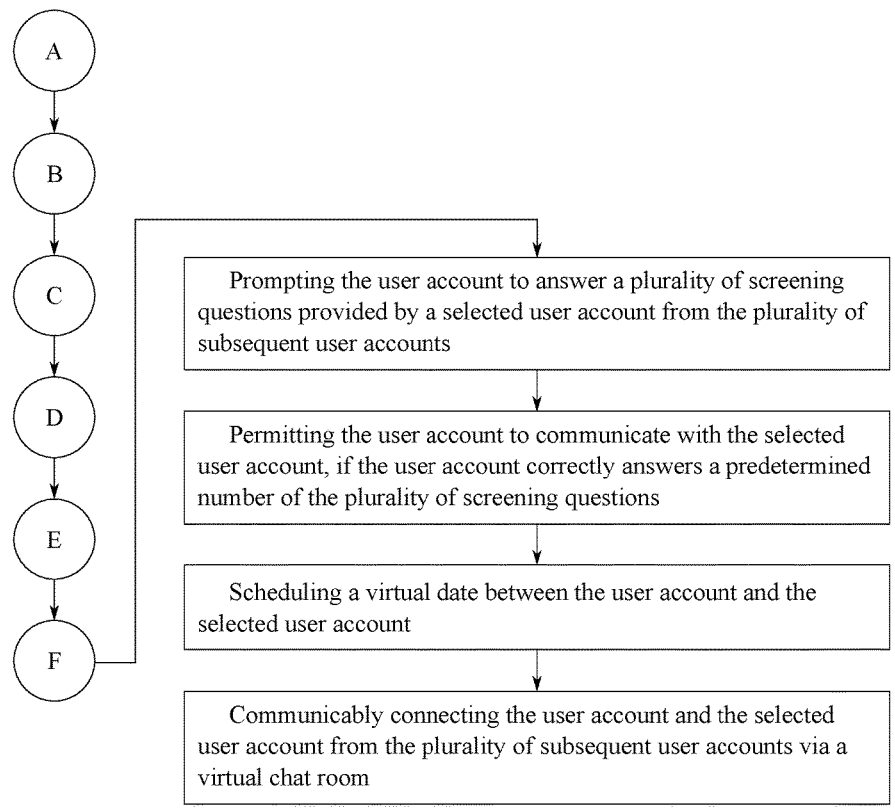
FIG. 16 is a flowchart thereof, further depicting the steps for receiving permission to contact a selected user account from the plurality of subsequent user accounts.

In reference to FIG. 16, if the selected user account has enabled the ask me feature, then the back-end system prompts the user account to answer the plurality of screening questions provided by the selected user account when the user account attempts to contact the selected user account. The user account then proceeds to answer each of the plurality of screening questions. If the user account correctly answers a predetermined number of the plurality of screening questions, then the back-end system permits the user account to communicate with the selected user account. If the user account fails to correctly answer the predetermined number of the plurality of screening questions, then the user account is denied contact with the selected user account. The user account may be allowed to try and answer the plurality of screening questions again, if permitted by the selected user account.

When the user account is permitted to contact the selected user account, the user account can send the selected user account a message, or a request to voice chat or video chat. In further reference to FIG. 16, the back-end system also allows the user account to schedule a virtual date with the selected user account. The user account can select a day and a time and send a date proposal to the selected user account. The back-end system then forwards the day and the time to the selected user account, wherein the selected user account can accept the date proposal, reject the date proposal, or respond with an alternative date or time. The user account and the selected user account can continue to propose dates and times until both parties are able to come to an agreed upon date and time. Once the user account and the selected user account come to the agreed upon date and time, the back-end system stores the agreed upon date and time in a database and schedules the virtual date for the agreed upon date and time.

On the agreed upon date and time, the back-end system communicably connects the user account and the selected user account via a virtual chatroom. The back-end system may also send a date reminder to the user account and the selected user account prior to the agreed upon data and time in order to remind the user account and the selected user account of the virtual date. The virtual chatroom provides a "safe date" in a comfortable web-based environment, without the common hazards or social awkwardness associated with in-person meetings. The virtual chatroom includes a restaurant module, a vehicle module, and a gifting module that can be utilized by the user account and the selected user account to interact with each other. Furthermore, the virtual chatroom supports advertisements from various sponsors such as jewelry stores, florist locations and other companies that cater to relationships. Such advertisements are displayed within the restaurant module and the vehicle module.

The restaurant module allows the user account and the selected user account to choose an actual restaurant within any given city. The restaurant can be selected prior to the virtual date, or at the start of the virtual date. When searching within a specific city, a plurality of available restaurants is displayed, from which the user account and the selected user account may select the restaurant for the virtual date. External pictures are displayed for each of the available restaurants to give the user account and the selected user account a feel for the location and atmosphere. The external pictures can be retrieved by the back-end system from the website associated with each of the available restaurants, or by utilizing a satellite imagery tool to gather pictures of the outside of each of the available restaurants.

Once the user account and the selected user account choose the restaurant from the available restaurants, interior images and a real-time menu for the restaurant can be viewed. The real-time menu can be provided through the website of the restaurant or through a menu extraction tool used by the back-end system, wherein the menu extraction tool is used to access the website of the restaurant and retrieve the real-time menu. In the preferred embodiment, the interior images provide a 360 panoramic view of the restaurant. The 360 panoramic view is used as a background template during the meal, wherein a live webcam stream from both the user account and the selected user account is displayed in the middle of the 360 panoramic view. The 360 panoramic view serves to create the ambiance of the restaurant selected by the user account and the selected user account. Advertisements may be displayed alongside the 360 panoramic view and the live webcam stream of the user account and the selected user account.

The vehicle module is an optional feature that can be utilized in conjunction with the restaurant module. The vehicle module allows the user account, or the selected user account, to choose a vehicle that is used in a virtual simulation of picking up and dropping off a date. Similar to the restaurant module, the vehicle module displays a plurality of available vehicles from which the user account may select a desired vehicle. A picture is displayed for each of the available vehicles, allowing the user account to easily select the desired vehicle. A vehicle customization tool may also be provided through the back-end system, allowing the user account to manipulate features of the desired vehicle, such as exterior color, interior color, etc. Once the desired vehicle is selected, the live webcam stream for the user account and the selected user account is displayed over an image of the exterior or the interior of the desired vehicle. Advertisements may be displayed alongside the exterior or interior image of the desired vehicle and the live webcam stream of the user account and the selected user account.

Figure 17:
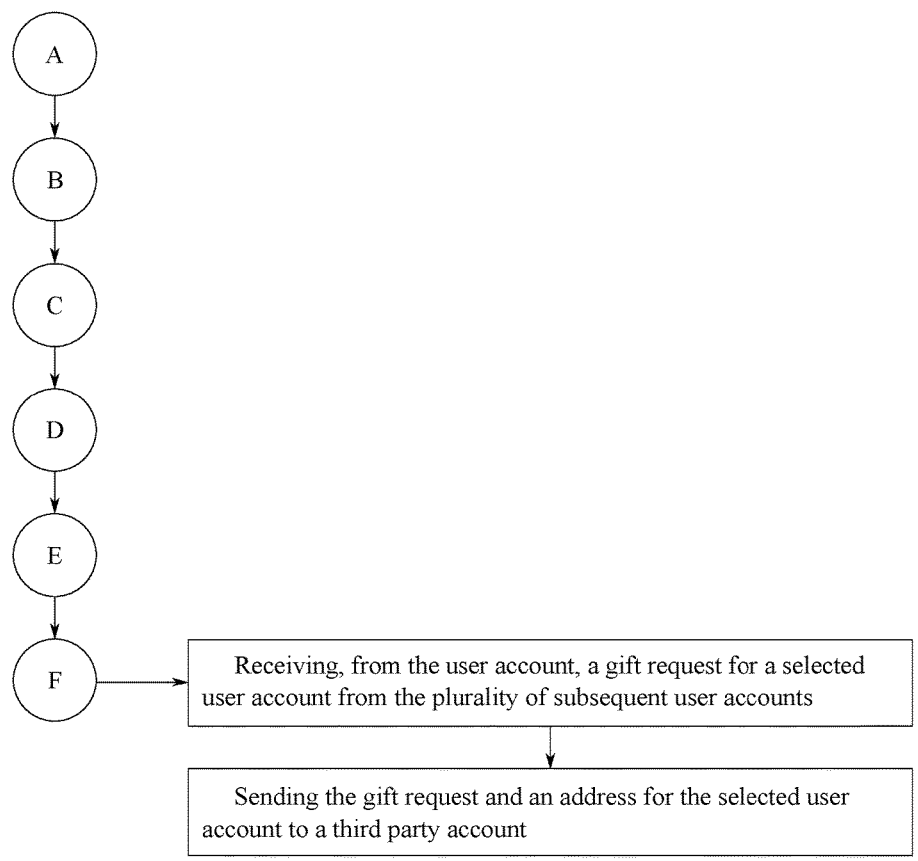
FIG. 17 is a flowchart thereof, further depicting the steps for sending a gift to the selected user accounts.

The gifting module allows the user account to send a gift to the selected user account, without revealing personal information of the selected user account, or vice versa. The user account first selects the gift from a plurality of available gifts. In reference to FIG. 17, upon selecting the gift, a gift request for the gift is received by the back-end system, wherein the back-end system sends the gift request to a third party account of the business supplying the gift. Prior to sending the gift request, the back-end system retrieves an address for the selected user account and includes the address in the gift request. In this way, the third party account is able to send the gift to the address of the selected user account, while the address is not shared with the user account. Advertisements may be displayed alongside the available gifts in order to entice the user account to make additional purchases. The gifting module can also be utilized outside of the virtual chatroom.

Future or alternative embodiments may include other optional modules not listed here, such as virtual horse-drawn carriage rides, walks on the beach, and other forms of gift delivery. Such other modules would function similarly to the aforementioned restaurant module, vehicle module, and gifting module. These modules would be optional additions that can be included in various dates at the discretion of the user account and the selected user account.

The dating questionnaire module provides a match making game, wherein the identity of each individual is incrementally revealed as the match making game progresses. The match making game is played between a ring leader and a plurality of participants. In the preferred embodiment, the plurality of participants is specifically three participants, however, the specific number may vary in other embodiments. The user account may be either the ring leader or one of the plurality of participants; the designation of the user account varying from one game to the next. If the user account is the ring leader, then each of the plurality of participants is a subsequent user account. If the user account is one of the plurality of participants, then a subsequent user account is the ring leader.

The ring leader first selects a gender preference; the gender preference can be for a single gender, or multiple genders. The back-end system receives the gender preference and selects the plurality of participants accordingly. For example, if the gender preference is male, then each of the plurality of participants selected will be male, and if the gender preference is female, then each of the plurality of participants selected will be female. In addition to the gender selection, the ring leader may also be able to define match preferences as described in the music response module description, wherein the match preferences of the ring leader is used to further influence the selection of the plurality of participants. Once the plurality of participants has been selected by the back-end system, the ring leader is prompted to ask the plurality of participants a plurality of questions.

A profile box for each of the plurality of participants is displayed to the ring leader, wherein the profile box for each of the plurality of participants shows a distorted profile-picture image. The ring leader then asks a question to the plurality of participants, wherein each of the plurality of participants is given a predetermined amount of time to answer the question. After the predetermined amount of time has expired, the answer submitted by each of the plurality of participants is automatically displayed to the ring leader. The ring leader can then evaluate the answer submitted from each of the plurality of participants and select the best answer(s) by accepting or rejecting answers. The ring leader can accepts one answer, multiple answers, or no answers. If the ring leader accepts the answer from one of the plurality of participants, then the participant is awarded a point and the profile box is updated to display a less distorted profile-picture image.

The ring leader continues to ask the plurality of participants questions, wherein the profile box of each of the plurality of participants is decreasingly distorted as each of the answers submitted by the plurality of participants is accepted. In the preferred embodiment, there are five rounds for a total of five questions asked by the ring leader and a total of five answers provided by each of the plurality of participants. Other embodiments may employ more or less rounds, or the option for the ring leader to determine the number of rounds. Upon completing all rounds, if there is a tie, meaning the ring leader has approved the same number of answers for two or more participants, then the ring leader is prompted to ask a tie breaker question. A subsequent tie breaker question may be asked if the ring leader approves two or more answers for the tie breaker question.

Once the match making game has concluded, a winner is anointed from the plurality of participants. The profile box of each of the plurality of participants is also updated to display a full profile picture. Additionally, a profile picture for the ring leader is displayed to the plurality of participants. Furthermore, each of the plurality of participants is able to view the full profile picture of each of the plurality of participants. The ring leader is directed to a profile page of the winner, wherein the ring leader can further engage the winner. If the ring leader desires to play the match making game again, then the ring leader becomes one of the plurality of participants for the subsequent game. This ensures that there is equal opportunity for users to play as the ring leader.

Similar to the dating questionnaire module, the speed dating module allows the user account to interact with a plurality of a speed dating participants. However, the speed dating module allows the user account to interact with each of the plurality of speed dating participants one-on-one. Each of the plurality of speed dating participants is selected by the back-end system. The plurality of speed dating participants can be selected either randomly or according to the match preferences of the user account. Once the plurality of speed dating participants is selected, the user account is sequentially engaged with each of the plurality of speed dating participants.

The user account may engage with the plurality of speed dating participants via webcam, audio chat, or text chat. The user account is communicably coupled with each of the plurality of speed dating participants in sequence for a predetermined time. For example, the predetermined time may be one minute, wherein the user account engages with three participants for a total of three minutes. When the user account is engaged with one of the plurality of speed dating participants, the back-end system presents a time expiration warning at a certain amount of time is remaining; for example, ten seconds. After the predetermined time has expired, the user account is disconnected from the current participant and connected to a subsequent participant. Such a process is continued until the user account has engaged with each of the plurality of speed dating participants.

Once the user account has been engaged with each of the plurality of speed dating participants, both the user account and the plurality of speed dating participants can choose to continue engagement. Two buttons are presented to both the user account and the plurality of speed dating participants; an interested button and a not-interested button. If both the user account and one of the plurality of speed dating participants selects the interested button, then communication may resume between the two individuals. The two individuals can continue to communicate immediately, or a time can be scheduled to continue conversing later. If either the user account or one of the plurality of speed dating participants selects the not-interested button, then further communication between the two individuals is denied. The party that was rejected is notified by the back-end system that there was no match.

Although the invention has been explained in relation to its preferred embodiment, it is to be understood that many other possible modifications and variations can be made without departing from the spirit and scope of the invention as hereinafter claimed.

What is claimed is:

1. A computer implemented method for matching individuals based on emotions evoked by listening to music, said method is executable by computer-executable instructions stored on a non-transitory computer readable medium to cause one or more computing devices to perform a plurality of operations, comprising the steps of:

creating, by one or more computing devices, a plurality of audio files, wherein said audio files are created by playing various instruments and sounds, which are recorded through a computing device;

attaching, by one or more computing devices, a plurality of emotional annotations to each of the plurality of created audio files;

calculating, by one or more computing devices, a consensus emotional annotation from the plurality of emotional annotations for each of the plurality of created audio files;

sending, by one or more computing devices, the plurality of created audio files to a plurality of focus group accounts to listen to said audio files;

selecting, by one or more computing devices, an emotional annotation retrieved from a dataset stored in an electronic database for each of the plurality of created audio files to represent an evoked emotion, experienced by the plurality of focus group accounts while listening to said audio file;

attaching, by one or more computing devices, a final consensus emotional annotation to each of the plurality of audio files;

selecting, by one or more computing devices, from a list of a plurality of music genres, and retrieving, by one or more computing devices, a plurality of personality matching questions wherein each of the plurality of personality matching questions includes a plurality of emotional annotated audio files as answer choices to said personality matching questions corresponding to the selected music genre;

prompting, by one or more computing devices, a user account to select one of the plurality of emotional annotated audio files as an answer to each of the plurality of personality matching questions;

retrieving, by one or more computing devices, a response for each of the plurality of personality matching questions from the user account;

aggregating, by one or more computing devices, the response for each of the plurality of personality matching questions into a response profile;

comparing, by one or more computing devices, the response profile to a plurality of subsequent response profiles, wherein each of the plurality of subsequent response profiles is associated with one of a plurality of subsequent user accounts;

calculating, by one or more computing devices, a match probability rating for each of the plurality of subsequent response profiles in relation to the response profile and storing said calculated match probability rating for each of the plurality of subsequent response profiles in relation to the response profile, in a database;

scheduling, by one or more computing devices, a virtual date between the user accounts;

selecting, by one or more computing devices, a scheduling tool wherein a user account invites another user account for a virtual date and selects a city and actual restaurant within said city, from a list of restaurant names and/or pictures listed, for the virtual date;

receiving, by one or more computing devices, an interior of the actual restaurant retrieved;

transmitting, by one or more computing devices, a live video stream including a 360 degree panoramic view of the interior of the selected restaurant and while communicating through the live video stream, by one or more computing devices, said user account accesses a menu extraction tool wherein the menu extraction tool retrieves a real-time menu for the selected restaurant.

2. The computer implemented method for matching individuals based on emotions evoked by listening to music, said method is executable by computer-executable instructions stored on a non-transitory computer readable medium to cause one or more computing devices to perform a plurality of operations, wherein the method as claimed in claim 1 further comprises the step of: receiving, by one or more computing devices, a music genre selection wherein the music genre is selected by the user account.

3. The computer implemented method for matching individuals based on emotions evoked by listening to music, said method is executable by computer-executable instructions stored on a non-transitory computer readable medium to cause one or more computing devices to perform a plurality of operations, wherein the method as claimed in claim 1 further comprises the steps of:

prompting, by one or more computing devices, an arbitrary user account from the plurality of subsequent user accounts to select, by at least one computing device of the one or more computing devices, one of the plurality of emotional annotated audio files as a subsequent response for each of the plurality of personality matching questions;

receiving, by one or more computing devices, the subsequent response for each of the plurality of personality matching questions from the arbitrary user account; and aggregating, by one or more computing devices, the subsequent response for each of the plurality of personality matching questions into a corresponding response profile, wherein the corresponding response profile is included as one of the plurality of subsequent response profiles.

4. The computer implemented method for matching individuals based on emotions evoked by listening to music, said method is executable by computer-executable instructions stored on a non-transitory computer readable medium to cause one or more computing devices to perform a plurality of operations, wherein the method as claimed in claim 1 further comprises the steps of: prompting, by one or more computing devices, the arbitrary user account to provide an answer to a bonus question; receiving a favorite song as the answer to the bonus question; and aggregating, by one or more computing devices the favorite song into the corresponding response profile.

5. The computer implemented method for matching individuals based on emotions evoked by listening to music, said method is executable by computer-executable instructions stored on a non-transitory computer readable medium to cause one or more computing devices to perform a plurality of operations, wherein the method as claimed in claim 1 further comprises the steps of:
   receiving, by one or more computing devices, match preferences from the user account; and
   filtering, by one or more computing devices, the response profile for the plurality of subsequent user accounts according to the match preferences.

6. The method for matching individuals based on emotions evoked when listening to music, by executing computer-executable instructions stored on a non-transitory computer readable medium to cause one or more computing devices to perform a plurality of operations, wherein the method as claimed in claim 1 further comprises the step of: ranking, by one or more computing devices, each of the plurality of subsequent user accounts according to the match probability rating of each of the plurality of subsequent response profiles.

7. The computer implemented method for matching individuals based on emotions evoked by listening to music, said method is executable by computer-executable instructions stored on a non-transitory computer readable medium to cause one or more computing devices to perform a plurality of operations, wherein the method as claimed in claim 1 further comprises the steps of:
   prompting, by one or more computing devices, the user account to answer a plurality of stored screening questions provided by a selected user account from the plurality of subsequent user accounts before the user account is able to communicate with the selected user account; and
   permitting, by one or more computing devices, the user account to communicate with the selected user account if the user account correctly answers a predetermined number of the plurality of screening questions.

8. The computer implemented method for matching individuals based on emotions evoked by listening to music, said method is executable by computer-executable instructions stored on a non-transitory computer readable medium to cause one or more computing devices to perform a plurality of operations, wherein the method as claimed in claim 1 further comprises the step of:
   filtering, by one or more computing devices, the plurality of matched user accounts according to purchase behavior data obtained from a third party database.

9. The computer implemented method for matching individuals based on emotions evoked by listening to music, said method is executable by computer-executable instructions stored on a non-transitory computer readable medium to cause one or more computing devices to perform a plurality of operations, wherein the method as claimed in claim 1 further comprises the step of: communicably connecting, by one or more computing devices, the user account and a selected user account from the plurality of subsequent user accounts via a virtual chat room that is set within a 360 panoramic interior view of the actual restaurant chosen by the user as the backdrop of the live webcam stream between the user account and the selected user account.

10. The computer implemented method for matching individuals based on emotions evoked by listening to music, said method is executable by computer-executable instructions stored on a non-transitory computer readable medium to cause one or more computing devices to perform a plurality of operations, wherein the method as claimed in claim 1 further comprises the steps of:
   selecting, by one or more computing devices, a picture of a vehicle from a plurality of available vehicles;
   displaying, by one or more computing devices, a live webcam stream for user account and the selected user account over a virtual image of the exterior or interior of the selected vehicle;
   receiving, by one or more computing devices, from the user account, a gift request for a selected user account from the plurality of subsequent user accounts;
   sending, by one or more computing devices, the gift request of the user account to a third party business account for the business to supply the requested gift to the selected user account from the plurality of subsequent user accounts;
   retrieving, by one or more computing devices, an email or postal address for the selected user account to provide to the third party account of the business to supply the requested gift, without revealing such email address or postal address to the user account;
   and sending, by one or more computing devices, the requested gift to the user account's email address or postal address.

* * * * *